US012761310B2

(12) United States Patent
Linn et al.

(10) Patent No.: US 12,761,310 B2
(45) Date of Patent: Oct. 13, 2026

(54) SENSOR DEVICE AND SENSOR SYSTEM FOR MONITORING A MACHINE

(71) Applicant: FRABA B.V., SG Heerlen (NL)

(72) Inventors: Anja Linn, Aachen (DE); Ingo Moench, Singapore (SG); Tobias Schubert, Cologne (DE); Dimitri Pritzkau, Troisdorf (DE)

(73) Assignee: FRABA B.V., SG Heerlen (NL)

( * ) Notice: Subject to any disclaimer, the term of this patent is extended or adjusted under 35 U.S.C. 154(b) by 321 days.

(21) Appl. No.: 18/689,077

(22) PCT Filed: Sep. 6, 2021

(86) PCT No.: PCT/EP2021/074456
§ 371 (c)(1),
(2) Date: Apr. 19, 2024

(87) PCT Pub. No.: WO2023/030660
PCT Pub. Date: Mar. 9, 2023

(65) Prior Publication Data

US 2024/0369673 A1 Nov. 7, 2024

(51) Int. Cl.
*G01S 5/02* (2010.01)

(52) U.S. Cl.
CPC .......... *G01S 5/02585* (2020.05); *G01S 5/021* (2013.01); *G01S 5/0258* (2020.05); *G01S 5/0247* (2013.01); *G01S 5/02685* (2020.05)

(58) Field of Classification Search
CPC .... G01S 5/02585; G01S 5/021; G01S 5/0247; G01S 5/02685; G01S 5/0258; G01S 5/0268

(Continued)

(56) References Cited

U.S. PATENT DOCUMENTS 7,948,431 B2 * 5/2011 Gulden .................. B25J 13/089 342/126
8,913,231 B2 * 12/2014 Williams ............. G01C 15/002 356/3.01

(Continued)

FOREIGN PATENT DOCUMENTS

DE 10 2005 000 732 A1 7/2006
JP 2008-38418 A 2/2008

(Continued)

OTHER PUBLICATIONS

S. Arash et al.: "5G Position and Orientation Estimation through Millimeter Wave MIMO", IEEE Globecom Workshops, pp. 1-6 (2015).

*Primary Examiner* — Chuong P Nguyen
(74) *Attorney, Agent, or Firm* — Norman B. Thot

(57) ABSTRACT

A sensor device and a sensor system for monitoring a machine. The sensor device includes a gyroscope sensor unit and/or an acceleration sensor unit, a radio interface which transmits data via a radio signal, and a distance determination unit which analyzes a received radio signal and determines, based on the received radio signal, an antenna distance to an antenna device from which the received radio signal was transmitted. The sensor system includes a plurality of the sensor device and a position determination unit. The position determination unit receives measurement data of the gyroscope sensor unit and/or the acceleration sensor unit, receives the antenna distance of at least two sensor devices, and determines, based on the measurement data and the antenna distances provided, position data for the two sensor devices which indicate a spatial position of the two sensor devices relative to each other.

5 Claims, 4 Drawing Sheets

(58) Field of Classification Search
USPC .......................................... 342/450, 451, 463
See application file for complete search history.

(56) References Cited

U.S. PATENT DOCUMENTS

| | | | | |
|---|---|---|---|---|
| 10,401,176 | B2 * | 9/2019 | Nackers | E02F 3/434 |
| 10,521,703 | B2 * | 12/2019 | Beschorner | G01C 21/10 |
| 11,774,547 | B2 * | 10/2023 | Knuuttila | G01S 5/02585 455/456.1 |
| 12,006,663 | B2 * | 6/2024 | Kean | E02F 3/435 |
| 12,018,462 | B2 * | 6/2024 | Jagoda | E02F 9/264 |
| 12,235,340 | B2 * | 2/2025 | Tanaka | G01S 11/02 |
| 2010/0141506 | A1 | 6/2010 | Gulden et al. | |
| 2016/0249171 | A1 * | 8/2016 | Shemssulldin | G01S 5/0036 |
| 2018/0316086 | A1 | 11/2018 | Lehman et al. | |
| 2018/0372498 | A1 | 12/2018 | Nackers et al. | |
| 2020/0057134 | A1 * | 2/2020 | Fänge | G01S 5/0284 |

FOREIGN PATENT DOCUMENTS

| | | | | |
|---|---|---|---|---|
| JP | 2020-521344 | A | 7/2020 | |
| WO | WO-2017164925 | A1 * | 9/2017 | G01S 5/0263 |
| WO | WO 2018/236343 | A1 | 12/2018 | |

* cited by examiner

SENSOR DEVICE AND SENSOR SYSTEM FOR MONITORING A MACHINE

CROSS REFERENCE TO PRIOR APPLICATIONS

This application is a U.S. National Phase application under 35 U.S.C. § 371 of International Application No. PCT/EP2021/074456, filed on Sep. 6, 2021. The International Application was published in German on Mar. 9, 2023 as WO 2023/030660 A1 under PCT Article 21(2).

FIELD

The present invention is directed to a sensor device comprising: a gyroscope sensor unit and/or an acceleration sensor unit, and a radio interface for data transmission via a radio signal. The present invention is also directed to a sensor system for monitoring a machine, in particular for a construction machine such as an excavator, a crane or a bulldozer, wherein the sensor system comprises a plurality of the sensor devices.

BACKGROUND

Sensor devices with a gyroscope sensor unit and/or an acceleration sensor unit are also referred to, for example, as angular rate sensors, gyroscope instruments, acceleration meters, acceleration transducers, accelerometers, vibration transducers, oscillation transducers, G sensors, B meters or inertial measuring units.

Such sensor devices and sensor systems with such sensor devices are often used to monitor machine movements. The individual sensor devices of the sensor systems are in this case typically arranged on different parts of the machine which can move with respect to each other.

The term radio interface as used herein refers to all interfaces that allow for a wireless data transmission. Typical radio interfaces are, for example, RFID interfaces, WLAN interfaces, mobile radio interfaces, Bluetooth interfaces or IrDA interfaces.

US 2018/0372498 A1 describes a sensor system for monitoring the movement of an excavator. The sensor system comprises a plurality of inertial measuring units which are arranged on parts of the excavator which can move with respect to each other. The sensor data of the plurality of sensor devices are fused using a complex evaluation algorithm for determining the spatial position of the excavator and of the individual parts of the excavator, in particular of the bucket. To improve the accuracy of the sensor system, other types of sensor devices are, for example, used, such as a GPS device, a radar device or cameras.

SUMMARY

An aspect of the present invention is to provide a relatively simple and yet reliable monitoring of machine movements.

In an embodiment, the present invention provides a sensor device and a sensor system for monitoring a machine. The sensor device includes a gyroscope sensor unit and/or an acceleration sensor unit, a radio interface which transmits data via a radio signal, and a distance determination unit which analyzes a received radio signal and determines, based on the received radio signal, an antenna distance to an antenna device from which the received radio signal was transmitted. The sensor system includes a plurality of the sensor device and a position determination unit. The position determination unit is configured to receive measurement data of the at least one of the gyroscope sensor unit and the acceleration sensor unit of at least two of the plurality of the sensor device, to receive the antenna distance of at the least two of the plurality of the sensor device, and to determine, based on the measurement data and the antenna distances provided, position data for the at least two of the plurality of the sensor device which indicate a spatial position of the at least two of the plurality of the sensor device relative to each other.

BRIEF DESCRIPTION OF THE DRAWINGS

The present invention is described in greater detail below on the basis of embodiments and of the drawings in which.

DETAILED DESCRIPTION

Figure 1:
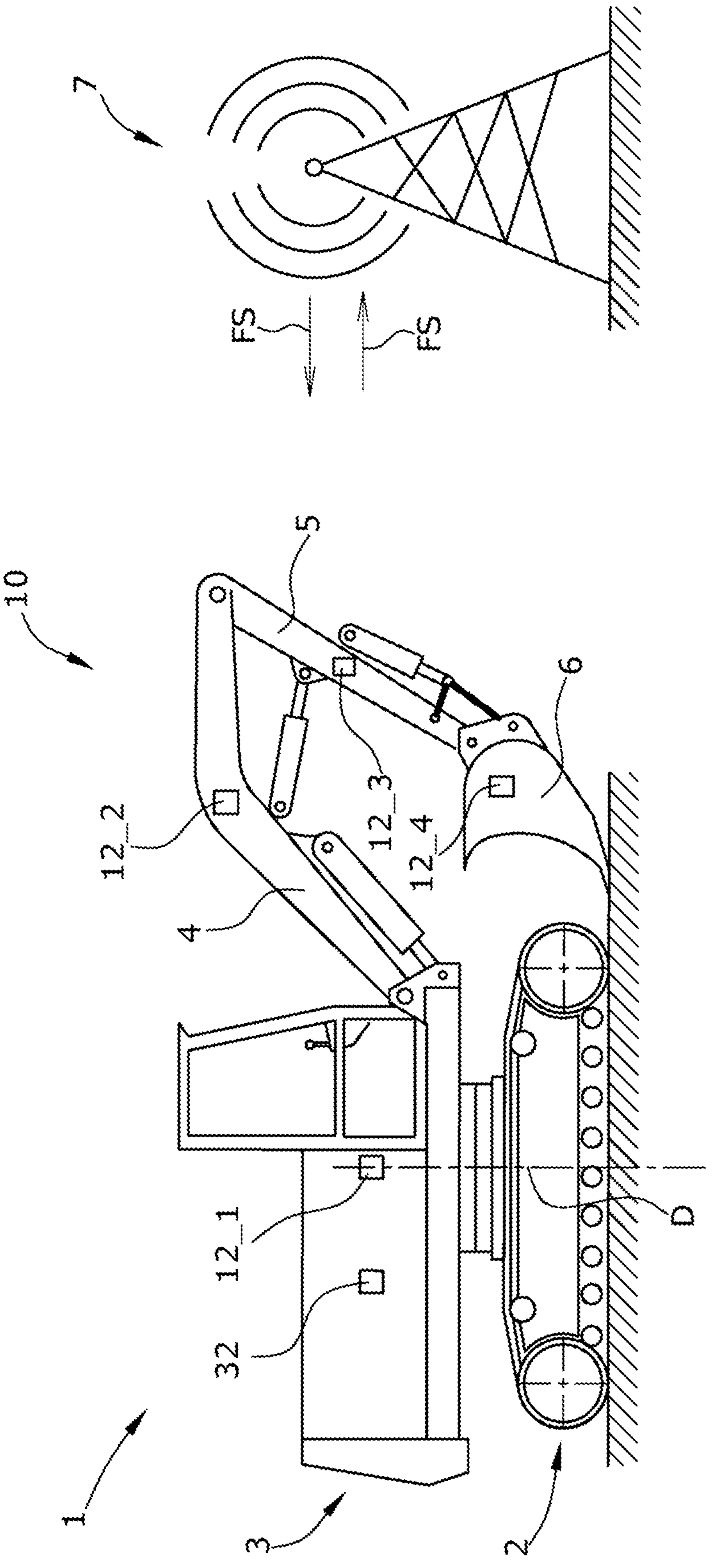
FIG. 1 schematically shows a sensor system according to the present invention with a plurality of sensor devices according to the present invention, which are arranged on an excavator, and a mobile radio antenna device.

The present invention provides a sensor device with a distance determination unit which is configured to analyze a received radio signal and to determine, based on the radio signal, an antenna distance to an antenna device from which the received radio signal was transmitted. A radio signal propagation delay and/or a radio signal amplitude can, for example, be analyzed for distance determination. The determined antenna distance provides additional information on the spatial position of the sensor device without additional sensors being required.

The additional position information allows, in particular when using several sensor devices according to the present invention in a sensor system, a relatively simple and at the same time exact determination of the spatial position of individual machine parts relative to each other and thus a relatively simple and reliable monitoring of a machine. The additional position information also allows a correction of measurement data of the gyroscope sensor unit and/or of the acceleration sensor unit, whereby a particularly precise determination of the spatial orientation of the individual sensor device and thus of the respective machine part is made possible.

The radio data interface can, for example, be a 5G mobile radio interface which allows a relatively exact determination of the antenna distance due to the properties of the 5G radio signal and a direct, relatively high-bandwidth internet connection of the sensor device, without additional radio base stations in the vicinity of the sensor device being required.

The present invention also provides a sensor system for monitoring a machine, the sensor system comprising a plurality of sensor devices according to the present invention as described above.

The sensor system according to the present invention comprises a position determination unit, to which measurement data of the gyroscope sensor unit and/or of the acceleration sensor unit and the antenna distance of at least two of the sensor devices are provided, and which is configured to determine position data for the at least two sensor devices based on the provided gyroscope sensor unit measurement data and/or acceleration sensor unit measurement data and the provided antenna distances, wherein the determined position data indicate a spatial position of the at least two sensor devices relative to each other. The measurement data of the gyroscope sensor unit and/or of the acceleration sensor unit generally indicate a spatial orientation of the respective sensor device. The position data can be determined (mainly via geometric relationships) based on the respective spatial orientation of the sensor devices and the respective antenna distance of the sensor devices. The position data indicate at least a distance between the respective sensor devices. The position data can, for example, indicate relative 3D coordinates for the respective sensor devices, meaning 3D coordinates in a machine reference system. If absolute 3D coordinates, meaning 3D coordinates in the earth reference system, are known for one of the sensor devices, the relative 3D coordinates can easily be converted into absolute 3D coordinates by the position determination unit or by a subsequent data processing unit. No additional sensor devices are required to determine the position data so that the sensor system according to the present invention allows for a relatively simple and yet reliable monitoring of machine movements.

The sensor system of the present invention can, for example, comprise at least one sensor device calibration unit which is configured to perform, based on the antenna distances of at least two of the sensor devices, a calibration of the gyroscope sensor unit and/or the acceleration sensor unit of at least one of the sensor devices. If the distance between two sensor devices and the antenna distances of the two sensor devices are known, the spatial orientation of the two sensor devices can be determined using geometric relationships. The gyroscope sensor unit and/or the acceleration sensor unit of the respective sensor devices can then be calibrated so that the spatial position indicated by the measurement data of the gyroscope sensor unit and/or the acceleration sensor unit matches the spatial position determined from the distances. To provide that the distance between the two sensor devices is known, a predefined machine state can, for example, be set. The distance between the two sensor devices can alternatively also be detected via one or more additional sensor devices. The sensor system can comprise a single central sensor device calibration unit which can, for example, be arranged in a central data processing device and which is configured to perform a calibration of several, for example, all, sensor devices. It is alternatively also conceivable that each sensor device is provided with a separate sensor device calibration unit, to which the antenna distance of at least one other sensor device is provided as well as the distance to the at least one other sensor device is known, and which is configured to perform a calibration of only the respective sensor device itself. The sensor device calibration unit allows for the providing particularly accurate and reliable measurement data, and thus allows for a particularly reliable monitoring of a machine via the sensor device according to the present invention.

The sensor system advantageously comprises at least one centrifugal force compensation unit which is configured to: determine, based on the position data for at least one sensor device, a rotation axis distance to a rotation axis of the machine which is to be monitored, estimate, based on the rotation axis distance and the measurement data of the gyroscope sensor unit and/or of the acceleration sensor unit of the respective sensor device, a centrifugal force which is acting on the respective sensor device, and perform, based on the estimated centrifugal force, a correction of the measurement data of the gyroscope sensor unit and/or of the acceleration sensor unit of the respective sensor device. The centrifugal force compensation unit is in particular configured to correct the measurement data of the gyroscope sensor unit and/or of the acceleration sensor unit so that measurement errors which are caused in the gyroscope sensor unit and/or in the acceleration sensor unit by the action of the centrifugal force are compensated. In order to allow for a simple and reliable determination of the rotation axis distance, one of the sensor devices can, for example, be designed to be mounted at a fixed distance to the machine rotation axis so that the distance to the rotation axis can be directly derived from a distance to this sensor device. One sensor device can, for example, be designed to be mounted directly at the machine rotation axis so that the distance to this sensor device is substantially the same as the distance to the machine rotation axis. The sensor system can comprise a single central centrifugal force compensation unit which can, for example, be arranged in a central data processing device and which is configured to perform a correction of the measurement data of several, for example, of all, sensor devices. It is alternatively also conceivable that each sensor device be provided with a separate centrifugal force compensation unit which is configured to perform only a calibration of the respective sensor device itself. The centrifugal force compensation unit allows for the providing of particularly accurate and reliable measurement data, and thus allows for a particularly reliable monitoring of a machine via the sensor device according to the present invention.

An embodiment of a sensor system according to the present invention with a plurality of sensor devices according to the present invention is described below with reference to the enclosed drawings.

FIG. 1 shows an excavator 1 with an undercarriage 2, an upper carriage 3 which is supported on the undercarriage 2 so that it can rotate about a rotation axis D, a boom 4 which is pivotably attached to the upper carriage 3, an arm 5 which is pivotably attached to the boom 4, and a bucket 6 which is pivotably attached to the arm 5.

FIG. 1 also shows an antenna device 7 which in the present embodiment is a 5G mobile radio antenna device, meaning that it is configured to transmit and receive mobile radio signals FS in accordance with the 5G standard.

A sensor system 10 according to the present invention is arranged on the excavator 1 for detecting the spatial position and orientation of the excavator 1 as well as of the individual parts thereof (i.e., of the undercarriage 2, the upper carriage 3, the boom, 4, the arm 5, and the bucket 6).

In the present embodiment, the sensor system 10 comprises four sensor devices 12_1-12_4 which are interconnected via a data transmission network 14. The first sensor device 12_1 is arranged on the upper carriage 3, the second sensor device 12_2 is arranged on the boom 4, the third sensor device 12_3 is arranged on the arm 5, and the fourth sensor device 12_4 is arranged on the bucket 6. The first sensor device 12_1 is arranged directly at the rotation axis D in the present embodiment.

Figure 2:
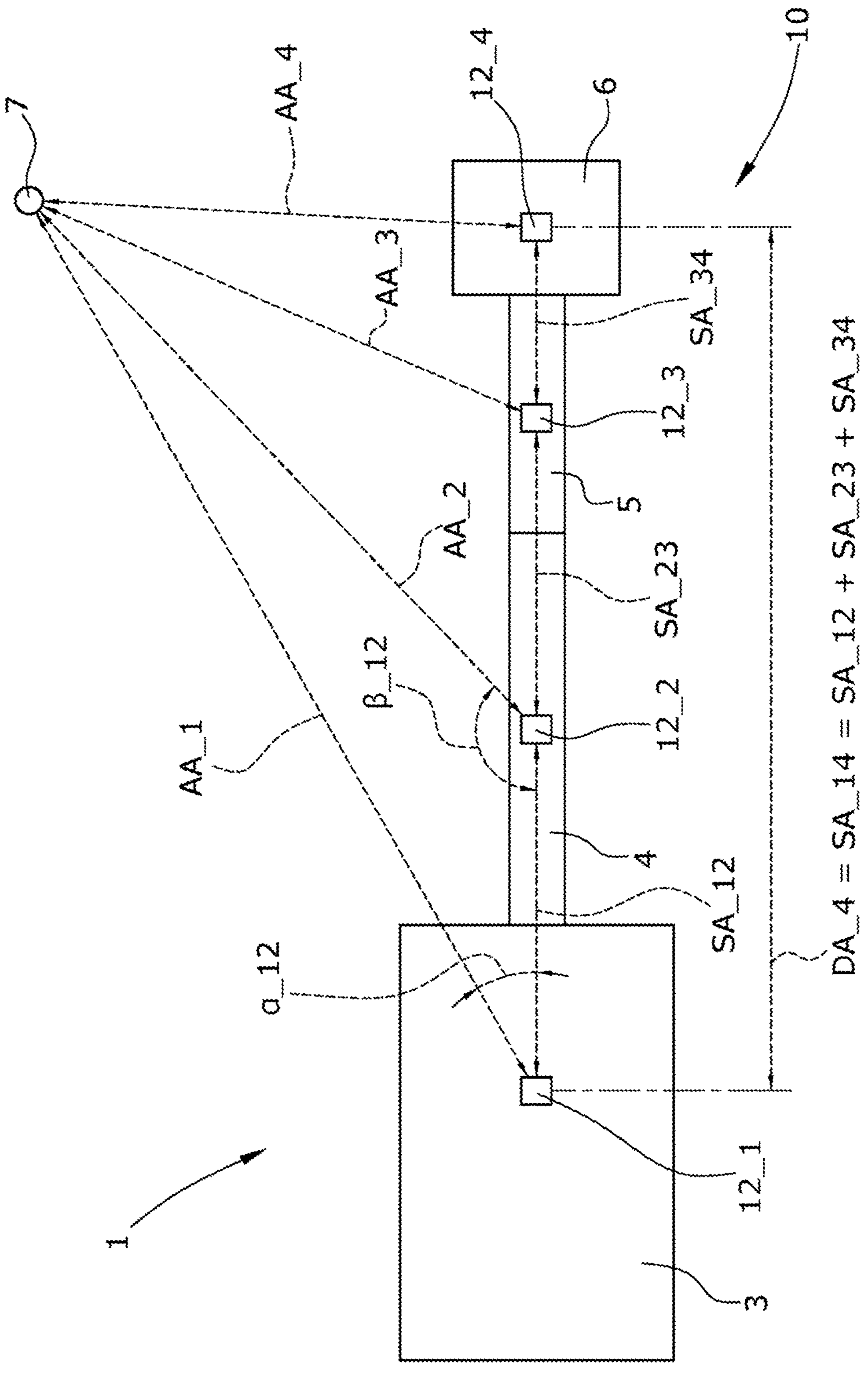
FIG. 2 shows a schematic top view of the sensor system and the mobile radio antenna device of FIG. 1, where antenna distances between the individual sensor devices of the sensor system and the mobile radio antenna device, and sensor device distances between the individual sensor devices of the sensor system and a rotation axis distance between a sensor device and a machine rotation axis are, for example, indicated.

FIG. 2 schematically shows a top view of the excavator 1 with the boom 4 being fully extended and the arm 5 being fully extended. FIG. 2 also schematically shows antenna distances AA_1-AA_4 between the individual sensor devices 12_1-12_4 and the antenna device 7, sensor device distances SA_12, SA_23, SA_34 between adjacent sensor devices 12_1-12_4, as well as an exemplarily rotation axis distance DA_4 between the fourth sensor device 12_4 and the rotation axis D.

Figure 3:
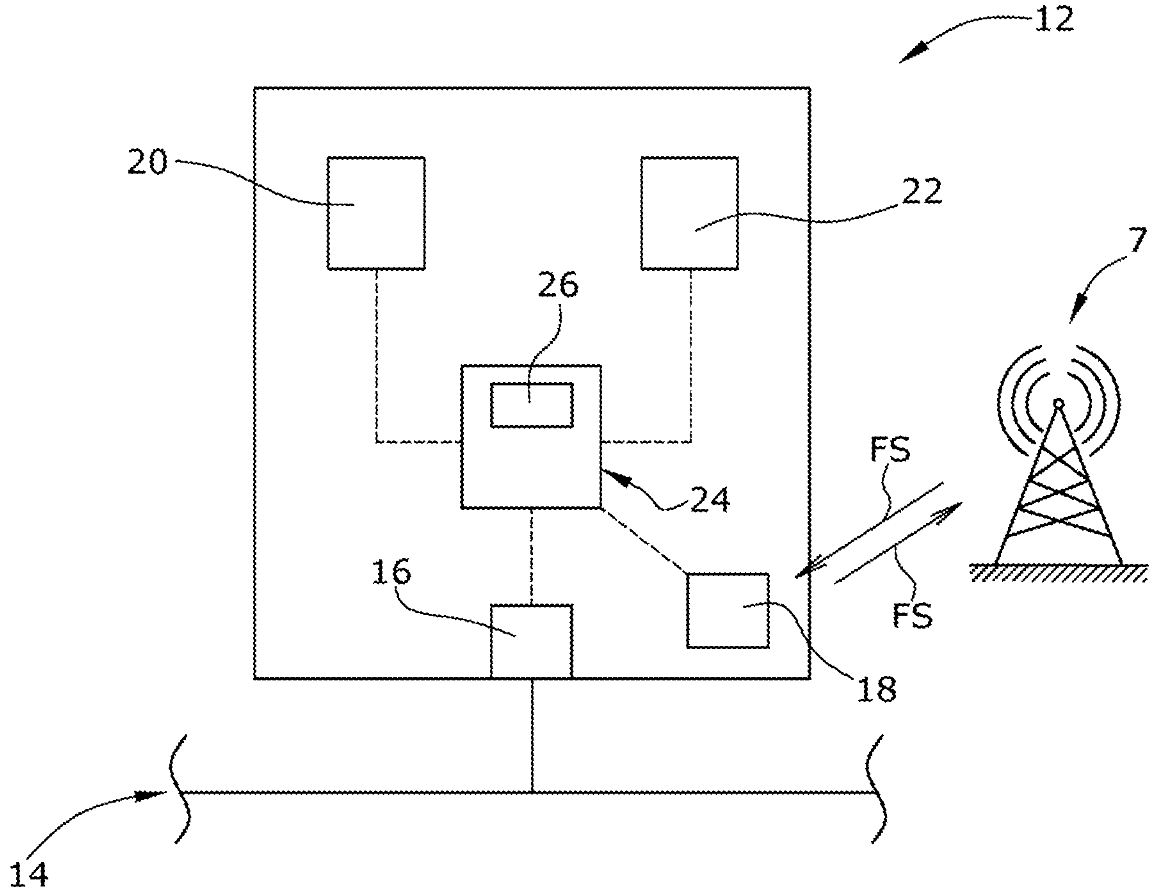
FIG. 3 schematically shows the structure of the sensor devices from FIG. 1.
Figure 4:
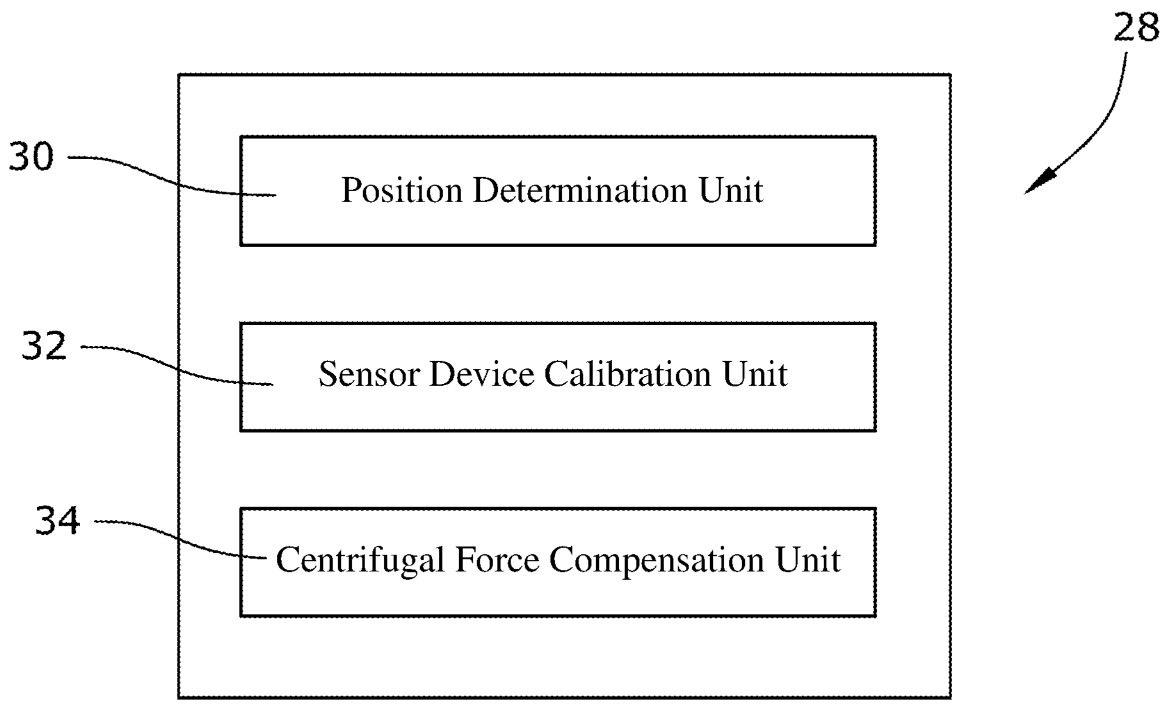
FIG. 4 schematically shows the structure of a central data processing unit of the sensor system from FIG. 1.

FIG. 3 schematically shows the structure of the sensor devices 12_1-12_4. Since the sensor devices 12_1-12_4 in the present embodiment have an essentially identical structure, generic reference numerals, meaning reference numerals without a sub numeration (i.e., _1 to _4), are used for simplification in FIG. 3 and in the following description, insofar as they relate to all sensor devices 12_1-12_4 or an arbitrary one of the sensor devices 12_1-12_4.

Each sensor device 12 comprises a wired interface 16 for connection to the data transmission network 14 and a radio interface 18 for data transmission via a radio signal FS. The radio interface 18 in the present embodiment is a 5G mobile radio interface, meaning that it is configured to transmit and receive mobile radio signals in accordance with the 5G standard.

In the present embodiment, each sensor device 12 further comprises a triaxial gyroscope sensor unit 20 which is configured to detect rotational velocities along three spatial axes and to provide corresponding gyroscope sensor unit measurement data, and a triaxial acceleration sensor unit 22 which is configured to detect accelerations along three spatial axes and to provide corresponding acceleration sensor unit measurement data.

Each sensor device 12 further comprises a computing unit 24, which is connected to the gyroscope sensor unit 20 and to the acceleration sensor unit 22 and which is configured to process the gyroscope sensor unit measurement data and the acceleration sensor unit measurement data. The computing unit 24 comprises a distance determination unit 26 which is configured to analyze a radio signal FS received from the antenna device 7 and to determine, based on the radio signal FS, an antenna distance AA from the respective sensor device 12 to the antenna device 7.

The sensor system 10 in the present embodiment further comprises a central data processing unit 28 which is arranged on the upper carriage 3. The central data processing unit 28 is connected to all sensor devices 12 via the data transmission network 14 and has access to the gyroscope sensor unit measurement data of the gyroscope sensor unit 20, the acceleration sensor unit measurement data of the acceleration sensor unit 22, and the antenna distance AA of each individual sensor device 12 which is determined by the distance determination unit 26.

The central data processing unit 28 comprises a position determination unit 30 which is configured to determine, based on the measurement data and antenna distances AA provided by the sensor devices 12, individual position data for each individual sensor device 12, each indicating the spatial position of the sensor devices relative to each other. The position determination unit 30 is further configured to provide the position data to the individual sensor devices 12.

The individual position data in the present embodiment comprises sensor device distances SA of the respective sensor device 12 to the respective other sensor devices 12. The sensor device distance SA between any two sensor devices 12 can be determined from the antenna distances AA of the two sensor devices 12 and the measurement data of the two sensor devices in a simple manner using geometric relationships. For example, the sensor device distance SA_12 shown in FIG. 2 can be determined as follows:

$$\mathrm{SA\_12} = \sqrt{\mathrm{AA\_1}^2 + \mathrm{AA\_2}^2 - 2\cdot\mathrm{AA\_1}\cdot\mathrm{AA\_2}\cdot\cos(180^\circ - \alpha\_12 - \beta\_12)}$$

wherein the angles α_12 and β_12 can be derived from the measurement data of the first sensor devices 12_1 and the measurement data of the second sensor devices 12_2. All other sensor device distances SA between two sensor devices 12 can analogously be determined based on the antenna distances AA of the respective sensor devices 12 and the angles α and β which can be derived from the measurement data of the respective sensor devices 12.

The position data can, for example, also comprise relative 3D coordinates, meaning coordinates in relation to a machine reference system, and/or absolute 3D coordinates, meaning coordinates in relation to the earth reference system, for the respective sensor device 12.

The central data processing unit 28 further comprises a sensor device calibration unit 32 which is configured to perform, based on the antenna distances AA of the sensor devices 12, a calibration of the gyroscope sensor unit 20 and/or the acceleration sensor unit 22 of one or more of the sensor devices 12. In the case that the sensor device distance SA between two sensor devices 12 is known, for example, when a defined excavator state is set, the angles α_12 and β_12 shown in FIG. 2 can, for example, be determined from the antenna distance AA_1, the antenna distance AA_2, and the sensor device distance SA_12, as follows:

$$\alpha\_12 = \arccos\left(\frac{\mathrm{AA\_2}^2 - \mathrm{AA\_1}^2 - \mathrm{SA\_12}^2}{-2\cdot\mathrm{AA\_1}\cdot\mathrm{SA\_12}}\right)$$

$$\beta\_12 = \arccos\left(\frac{\mathrm{AA\_1}^2 - \mathrm{AA\_2}^2 - \mathrm{SA\_12}^2}{-2\cdot\mathrm{AA\_2}\cdot\mathrm{SA\_12}}\right)$$

Based on the determined angles α_12 and β_12, the gyroscope sensor unit 20 and/or the acceleration sensor unit 22 of the first sensor device 12_1 and the second sensor device 12_2 can each be calibrated so that the angles α_12 and β_12 that can be derived from the measurement data of the two sensor devices 12 match the angles α_12 and β_12 that are determined based on the antenna distances AA and the sensor device distance SA. The gyroscope sensor unit 20 and/or the acceleration sensor unit 22 of all other sensor devices 12 can analogously also be calibrated based on the respective antenna distances AA and the respective sensor device distance SA.

The central data processing unit 28 further comprises a centrifugal force compensation unit 34 which is configured to determine, based on the position data determined by the position determination unit 30, a rotation axis distance DA from the rotation axis D for the individual sensor devices 12. Since the first sensor device 12_1 is arranged directly at the rotation axis D in the present embodiment, the rotation axis distance DA_1 of the first sensor device 12_1 is zero and the rotation axis distances DA_2-DA_4 of the remaining sensor devices 12_2 12_4 each are substantially equal to the sensor device distance SA between the respective sensor device 12 and the first sensor device 12_1. The centrifugal force compensation unit 34 is further configured to determine, based on the determined rotation axis distances DA and the measurement data of the individual sensor devices 12, a centrifugal force which acts on the individual sensor devices 12 during a rotation about the rotation axis D, and to perform, based on the determined centrifugal force, a correction of the gyroscope sensor unit measurement data and/or of the acceleration sensor unit measurement data of the individual sensor devices 12.

It is explicitly noted that the functions of the central data processing unit 28 provided in the present embodiment can also be performed in whole or in part by the computing unit 24 of one or more sensor devices 12. The position determination unit 30, the sensor device calibration unit 32 and/or the centrifugal force compensation unit 34 can in particular also be included in the computing unit 24 of one of the sensor devices 12. It is also conceivable that several decentralized position determination units, sensor device calibration units and/or centrifugal force compensation units are present, which perform the corresponding functions only for some of the sensor devices 12. Each sensor device 12 can, for example, have a separate position determination unit, sensor device calibration unit and/or centrifugal force compensation unit, which performs the corresponding functions only for the respective sensor device 12 itself.

It is furthermore explicitly pointed out that the sensor system according to the present invention can generally be used to monitor any kind of machine. The sensor system according to the present invention can in particular also be used for monitoring other construction machines, for example, for monitoring cranes or bulldozers.

The present invention is not limited to embodiments described herein; reference should be had to the appended claims.

LIST OF REFERENCE CHARACTERS

1 excavator
2 undercarriage
3 upper carriage
4 boom
5 arm
6 bucket
7 antenna device
10 sensor system
12 sensor devices (12_1, 12_2, 12_3, 12_4)
14 data transmission network
16 wired interface
18 radio interface
20 gyroscope sensor unit
22 acceleration sensor unit
24 computing unit
26 distance determination unit
28 central data processing unit
30 position determination unit
32 sensor device calibration unit
34 centrifugal force compensation unit
AA antenna distances (AA_1, AA_2, AA_3, AA_4)
α angle
β angle
D rotation axis
DA rotation axis distances
FS radio signal
SA sensor device distances (SA_1, SA_2, SA_3, SA_4)

What is claimed is:

1. A sensor system for monitoring a machine, the sensor system comprising:

a plurality of sensor devices, each of the plurality of sensor devices comprising, at least one of a gyroscope sensor unit and an acceleration sensor unit, a radio interface which is configured to transmit data via a radio signal, and a distance determination unit which is configured to analyze a received radio signal and to determine, based on the received radio signal, an antenna distance to an antenna device from which the received radio signal was transmitted; and a position determination unit which is configured, to receive measurement data of the at least one of the gyroscope sensor unit and the acceleration sensor unit of at least two of the plurality of the sensor devices, to receive the antenna distance of the at least two of the plurality of the sensor devices, and to determine, based on the measurement data and the antenna distances provided, position data for the at least two of the plurality of the sensor devices which indicate a spatial position of the at least two of the plurality of the sensor devices relative to each other.

2. The sensor system as recited in claim 1, further comprising:

a sensor device calibration unit which is configured to perform a calibration of the at least one of the gyroscope sensor unit and of the acceleration sensor unit of at least one of the plurality of the sensor devices based on the antenna distances of the at least two of the plurality of the sensor devices.

3. The sensor system as recited in claim 1, further comprising:

a centrifugal force compensation unit which is configured to, determine, based on the position data for at least one of the at least two of the plurality of the sensor devices, a rotation axis distance to a rotation axis of the machine to be monitored, estimate, based on the determined rotation axis distance and on the measurement data of the at least one of the gyroscope sensor unit and of the acceleration sensor unit of the at least one of the at least two of the plurality of the sensor devices, a centrifugal force which is acting on the at least one of the at least two of the plurality of the sensor devices, and perform, based on the estimated centrifugal force, a correction of the measurement data of the at least one of the gyroscope sensor unit and of the acceleration sensor unit of the at least one of the at least two of the plurality of the sensor devices.

4. The sensor system as recited in claim 1, wherein, each individual sensor device of the at least two sensor devices is arranged on a different machine part of a machine, the machine parts are moveable with respect to each other, and the position data for the at least two sensor devices indicates the spatial position of the at least two sensor devices relative to each other and thereby of the different machine parts of the machine relative to each other.

5. The sensor system as recited in claim 1, wherein the radio interface is a 5G mobile radio interface.

* * * * *